US009112982B2

(12) United States Patent
Cho et al.

(10) Patent No.: US 9,112,982 B2
(45) Date of Patent: Aug. 18, 2015

(54) METHOD OF CONTROLLING SOUND INPUT AND OUTPUT, AND ELECTRONIC DEVICE THEREOF

(71) Applicant: Samsung Electronics Co., Ltd., Gyeonggi-do (KR)

(72) Inventors: Jae-Wan Cho, Gyeonggi-do (KR); Sung-Ho Son, Daegu (KR); Jung-Woo Lee, Gyeonggi-do (KR); Keum-Ju Jang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/075,267

(22) Filed: Nov. 8, 2013

(65) Prior Publication Data

US 2014/0235290 A1    Aug. 21, 2014

(30) Foreign Application Priority Data

Feb. 19, 2013  (KR) .......................... 10-2013-0017616

(51) Int. Cl.
*H04M 1/00* (2006.01)
*H04R 5/02* (2006.01)
*H04M 1/60* (2006.01)
*H04W 4/00* (2009.01)
*H04M 1/725* (2006.01)

(52) U.S. Cl.
CPC ............ *H04M 1/6058* (2013.01); *H04W 4/008* (2013.01); *H04M 1/6066* (2013.01); *H04M 1/72558* (2013.01); *H04M 2250/12* (2013.01)

(58) Field of Classification Search
None
See application file for complete search history.

(56) References Cited

U.S. PATENT DOCUMENTS

| 2006/0030360 | A1  | 2/2006 | Yeh |
| 2009/0023479 | A1* | 1/2009 | Hulvey ....................... 455/569.1 |
| 2012/0077503 | A1* | 3/2012 | Kalayjian et al. ............. 455/445 |
| 2012/0230507 | A1* | 9/2012 | DeLuca .......................... 381/74 |
| 2012/0244812 | A1  | 9/2012 | Rosener |

FOREIGN PATENT DOCUMENTS

| KR | 10-0617576 B1    | 8/2006 |
| KR | 10-2011-0065052 A | 6/2011 |

* cited by examiner

*Primary Examiner* — Thomas Lett
(74) *Attorney, Agent, or Firm* — Cha & Reiter, LLC

(57) ABSTRACT

A method employed by an electronic device comprising establishing communication between the electronic device and a sound processing device to activate sound input and output units of the sound processing device and deactivate sound input and output units of the electronic device. At least one item of measurement information of the electronic device is acquired and it is determined whether the measurement information item value satisfies a predetermined condition. In response to the measurement information satisfying the predetermined condition, the sound input and output units of the sound processing device are deactivated and the sound input and output units of the electronic device are activated.

16 Claims, 12 Drawing Sheets

METHOD OF CONTROLLING SOUND INPUT AND OUTPUT, AND ELECTRONIC DEVICE THEREOF

CLAIM OF PRIORITY

This application claims priority under 35 U.S.C. §119 from an application field in the Korean Intellectual Property Office on Feb. 19, 2013 and assigned Serial No. 10-2013-0017616, the contents of which are incorporated herein by reference.

BACKGROUND

1. Technical Field

The present disclosure concerns a system and method for controlling voice input and output of an electronic device.

2. Description of the Related Art

Known electronic devices support enable listening to music, performing voice communication and ordering printing by communicating with a headset, an earphone and a printer that have the Bluetooth function respectively in a wireless manner.

For example, the electronic device having the Bluetooth function searches for Bluetooth devices and performs a pairing process in order to communicate with other adjacent Bluetooth devices in a wireless manner. Thereafter, the electronic device is permitted to communicate with the other adjacent Bluetooth devices.

A known electronic device may be connected to a headset using a Bluetooth function with the device sound input and output paths being switched to the headset. A user unaware of this switch may attempt to make an outgoing call or receive an incoming call and be confused by the absence of sound. In order for a user to enable sound to be input and output through the electronic device when making an outgoing call or receiving an incoming call, a user is burdened by a need to take an additional action (for example, action of pressing a button) to switch from the sound input and output paths of the headset to the sound input and output paths of the electronic device.

In addition, where an earphone or headset is connected to the electronic device in a wired manner, the electronic device may appear to have non-functioning sound input and output due to a connection of the sound input and output paths being switched to an earphone or headset. In this case, a user needing input and output sound via the electronic device may be unaware he has to disconnect the wired-connected device from the electronic device. A system according to invention principles addresses these deficiencies and related problems and enables an electronic device to input and output sound as required by a user without requiring the user to switch the sound input and output paths of the headset.

SUMMARY

A system and method according to invention principles controls sound input and output when an electronic device connects to another device and improves control of sound input and output between an electronic device equipped with a Bluetooth function and another device having a Bluetooth function. The system switches sound input and output paths without requiring a switching action (for example, action of pressing a button or action of disconnecting a device from the electronic device).

According to an embodiment of the present invention, a method employed by an electronic device comprises determining a connection of an external device; acquiring at least one measurement information of the electronic device, determining whether the acquired measurement information satisfies a predetermined condition, and controlling a sound input and output units of the external device and the electronic device in response to the acquired measurement information satisfying the predetermined condition.

A system and method employed by an electronic device establishes communication between the electronic device and a sound processing device to activate sound input and output units of the sound processing device and deactivate sound input and output units of the electronic device. At least one item of measurement information of the electronic device is acquired and it is determined whether the measurement information item value satisfies a predetermined condition. In response to the measurement information satisfying the predetermined condition, the sound input and output units of the sound processing device are deactivated and the sound input and output units of the electronic device are activated.

In a feature, the sound processing device is connected to the electronic device in a wired or wireless manner, and provides sound input or output functions and comprises at least one of, (a) a headset, (b) an earset and (c) headphones. Further, the at least one item of measurement information of the electronic device is acquired in response to determination the electronic device is in a state where a phone call can be made or is receivable. The state includes a state in which an incoming call is received, a state in which an outgoing call is transmitted, and a state in which call-possible phone numbers are displayed on a display of the electronic device and an outgoing call can be made. The system and method re-activates the sound input and output units of the sound processing device and deactivates the sound input and output units of the electronic device in response to a call being terminated. The predetermined condition is stored in a memory of the electronic device and employs a reference threshold value for comparison with a measurement information item value.

In another feature, the system and method according to the present disclosure determines whether the measurement information satisfies the predetermined condition comprises determining whether the measurement information item value is larger than, smaller than or equal to the reference threshold value. The measurement information item includes at least one of: movement information indicating whether the electronic device is moved, derived from a sensor; distance information representing a distance between the electronic device and an object; pressure information representing a pressure applied to the electronic device; illumination information representing a measured illumination of the electronic device; and electrical current information representing a current flowing on a display surface of the electronic device. The electronic device movement is detected by an acceleration sensor.

In another feature, an electronic device, includes a communication unit, a processor at least one memory unit and a sensor device. The communication unit establishes communication with a sound processing device to activate sound input and output units of the sound processing device and deactivate sound input and output units of the electronic device. The sensor device acquires at least one measurement information item of the electronic device. The processor determines whether the measurement information item satisfies a predetermined condition and in response to the measurement information satisfying the predetermined condition, deactivating the sound input and output units of the sound processing device and activating the sound input and output units of the electronic device.

In another feature, the sensor device acquires the measurement information item in response to determination the electronic device is in a state where a phone call can be made or is receivable. The state includes a state in which an incoming call is received, a state in which an outgoing call is transmitted, and a state in which call-possible phone numbers are displayed on a display of the electronic device and an outgoing call may be made. The processor re-activates the sound input and output units of the sound processing device and deactivates the sound input and output units of the electronic device when a call is terminated.

In yet another feature, a system and method controls an electronic device by, in response to the electronic device establishing communication with a sound processing device supporting sound input and output, activating sound input and output units of the sound processing device and deactivating sound input and output units of the electronic device. The system and method detects whether an incoming call is received, an outgoing call is transmitted, or an outgoing call can be made and detects whether the electronic device is recently moved. The system and method determines whether a measured value is larger than, smaller than, or equal to a reference threshold value for determination of whether the electronic device is moved and in response to the determination, deactivates the sound input and output units of the sound processing device and activates the sound input and output units of the electronic device. The system and method re-activates the sound input and output units of the sound processing device and deactivates the sound input and output units of the electronic device when a call is terminated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION

Figure 1:
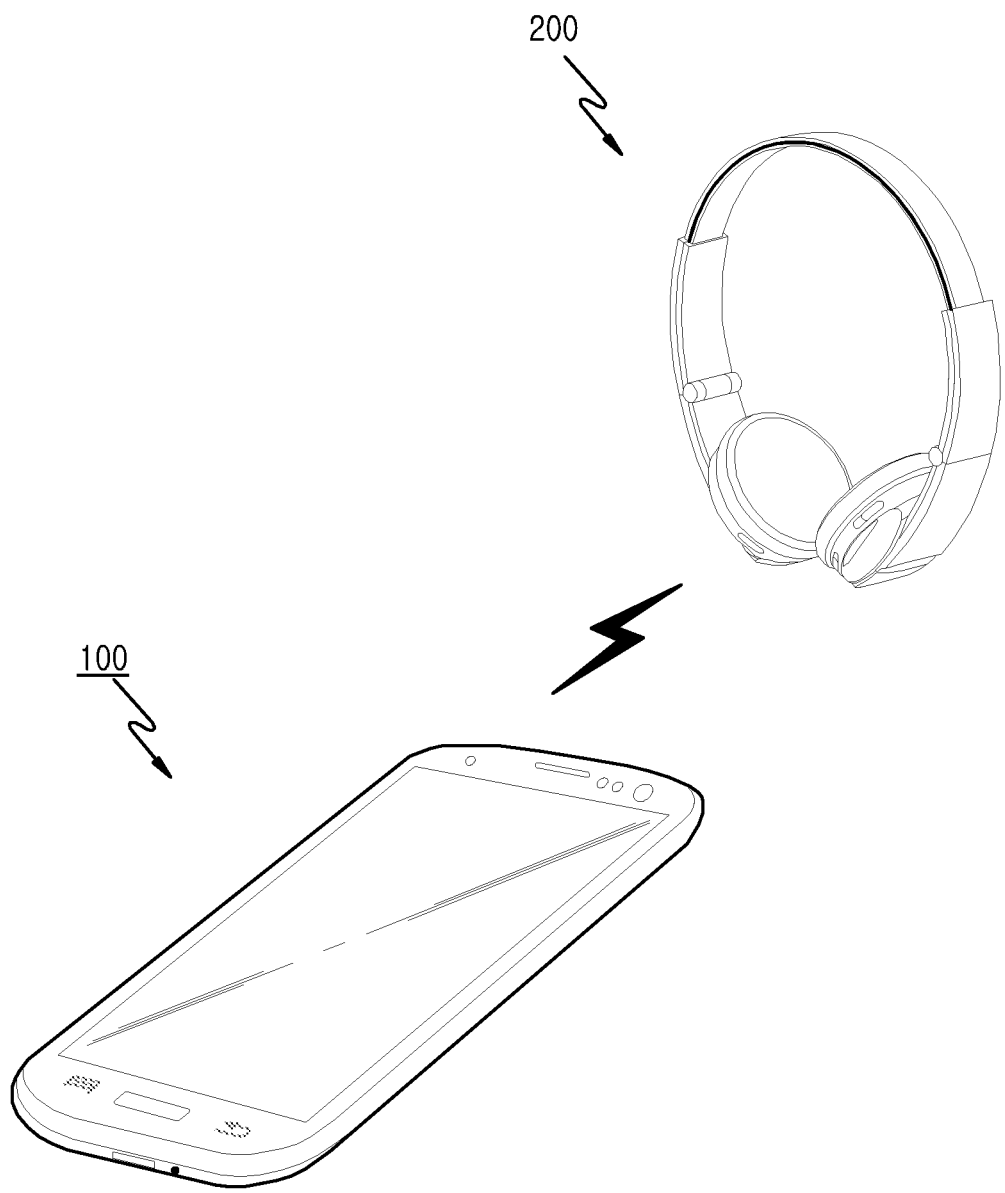
FIG. 1 is a diagram illustrating a wireless connection between a headset and an electronic device according to invention principles.

As various modifications can be made and diverse embodiments are applicable to the present invention, specific embodiments will be illustrated with reference to the accompanying drawings and described in detail in the detailed description. However, those specific embodiments should not be construed to limit the present invention, and should be construed as extending to all modifications, equivalents, and substitutes included in the spirit and technological scope of the invention.

The terms including an ordinal number such as first, second, etc. can be used to describe various elements, but the elements should not be limited by those terms. The terms are used merely for the purpose to distinguish an element from the other element. For example, a first element may be renamed to be a second element, and similarly, a second element may be renamed to be a first element.

In case where an element is "connected" or "linked" to the other element, it may be directly connected or linked to the other element, but another element may be present therebetween. On the contrary, in case where an element is "directly connected" or "directly linked" to another element, it should be understood that no other element is present therebetween.

It should be noted that the terms used herein are merely used to describe a specific embodiment, but not to limit the present invention. Incidentally, unless clearly used otherwise, expressions in the singular number include a plural meaning. In this application, the term "comprising," "including," or the like, intend to express the existence of the characteristic, the numeral, the step, the operation, the element, the part, or the combination thereof, and do not intend to exclude another characteristic, numeral, step, operation, element, part, or any combination thereof, or any addition thereto.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention.

FIG. 1 shows a connection device and an electronic device 100 comprising a mobile phone, a mobile pad, a media player, a tablet computer, a handheld computer, or a Personal Digital Assistant (PDA), for example. In addition, the electronic device may be an arbitrary electronic device including a device having two or more functions of the above-described devices. The connection device 200 may be an external device. Also, the external device may be a sound processing device that may comprise a wireless headset, an earset and a headphone for example, and may be a device capable of just inputting sound or just outputting sound, or a device capable of inputting and outputting sound. The connection device 200 may be connected to the electronic device 100 in a wired or wireless manner. In the case of wireless connection, a near field communication method is used. The near field communication method may include Bluetooth communication, NFC (Near Field Communication), WirelessHART communication, Zigbee communication or WiFi, for example. The following description as an example describes an electronic device 100 and device 200 being equipped with a Bluetooth function. The electronic device 100 and the connection device 200 may respectively include a Bluetooth module for establishing link connection with each other according to Bluetooth and enabling voice communication.

Figure 2:
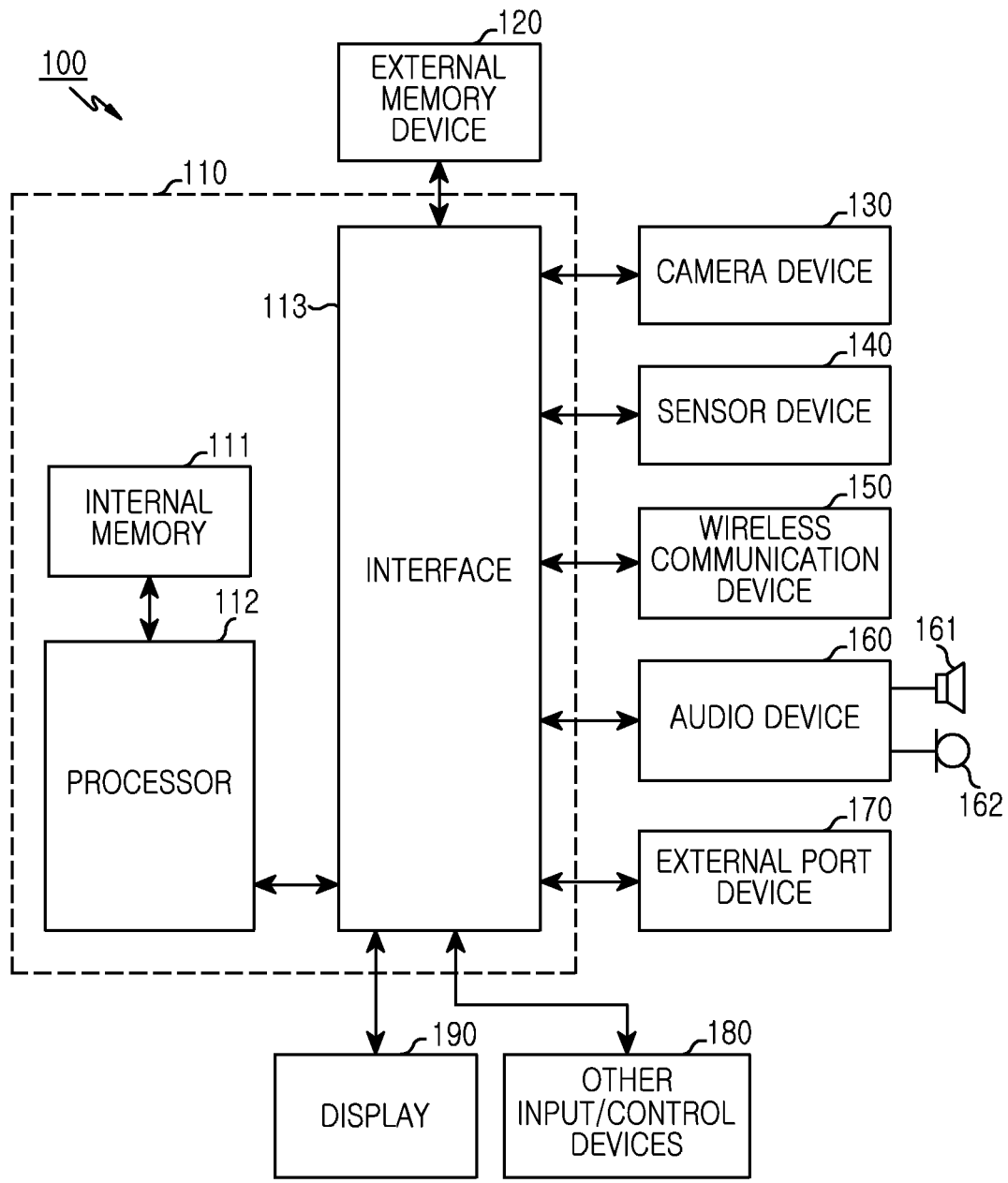
FIG. 2 shows an electronic device according to invention principles.

FIG. 2 shows an electronic device 100 including a host device 110, an external memory device 120, a camera device 130, a sensor device 140, a wireless communication device 150, an audio device 160, an external port device 170, a display 190 and other input/control devices 180. The external memory device 120 and the external port device 170 may comprise multiple devices. The host device 110 includes an internal memory 111, at least one processor 112, and an interface 113. The internal memory 111, the at least one processor 112, and the interface 113 may be separate components or may be configured by at least one integrated circuit.

The processor 112 executes software programs to perform different functions for the electronic device 100 including voice communication, video communication, and data communication. The processor 112 executes a software program (instruction set) stored in the internal memory 111 and/or the external memory device 120. In addition, the processor 112 controls a sound input/output module and controls the input unit and output unit of the electronic device 100. For example, the input unit of the electronic device 100 comprises the microphone 162, and the output unit comprises the speaker 161. The processor 112 includes at least one data processor, image processor, or codec. Furthermore, the data processor, the image processor or the codec may be separately configured in the electronic device 100. The interface 113 connects the various devices of the electronic device 100 to the host device 110. The camera device 130 acquires mages and video clips and may comprise a CCD (charged connection device) or a CMOS (complementary metal-oxide semiconductor), for example. In addition, the camera device 130 may change hardware configurations, for example, adjust lens movement or the number of apertures according to a camera program executed by the processor 112. The various elements of the electronic device 100 may be coupled by at least one communication bus (not illustrated) or electrical units (not illustrated).

The sensor device 140 includes at least one sensor detecting movement, light, temperature, tension, current and deformation for example. The sensor device 140 includes an acceleration sensor for measuring movement acceleration, a proximity sensor for measuring a distance from an object, and a pressure sensor for measuring a pressure which is applied to the electronic device 100. In addition, the sensor device 140 may include an illumination sensor for measuring illumination around the electronic device 100, or a current sensor for measuring a current flowing on the surface of the display 190 of the electronic device 100. In addition, the sensor device 140 may be implemented by combining two or more sensors of the above-described sensors.

The sensor device 140 acquires measurement information. The term "information" is used to denote, for example, a value, a parameter, a coefficient, or a component, but is not limited thereto. The measurement information is a term including the movement information and environment information of the electronic device 100. For example, the movement information may include acceleration information representing the movement acceleration of the electronic device 100, distance information representing a distance between the electronic device 100 and an object, and pressure information representing a pressure applied to the electronic device 100. In addition, the environment information may include illuminance information representing the measured illuminance of the electronic device 100, and current information representing a current flowing on the surface of the display 190 of the electronic device 100. The sensor device 140 may provide the acquired measurement information to the processor 112. In addition, the sensor device 140 may be attached to the electronic device 100.

The wireless communication device 150 enables wireless communication, and may comprise a wireless frequency transmitter and receiver, and optical (for example, infrared) transmitter and receiver. The wireless communication device 150 may operate through one of a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a WiFi (Wireless Fidelity) network, a WiMax network, and/or a Bluetooth network. The audio device 160 is connected to the speaker 161 and the microphone 162 to perform audio input and output functions such as voice recognition, voice replication, digital recording, and voice communication functions. That is, the audio device 160 communicates with the user through the speaker 161 and the microphone 162. In addition, the audio device 160 may receive data signals with the host device 110, convert the received data signals into electrical signals and output the converted electrical signals through the speaker 161.

In connecting the connection device 200 to the electronic device 100, the sound input and output paths of the connection device 200 may be used instead of those of the electronic device 100. For example, the electronic device 100 having a Bluetooth function searches for and identifies adjacent Bluetooth connection device 200 and performs a pairing process, thereby connecting to the connection device 200. In addition, the sound input and output units of the connection device 200 are activated and the sound input and output units of the electronic device 100 are deactivated. Herein, "activating the sound input and output units of the connection device 200" refers to switching on signal paths to the sound input and output units of the connection device 200. Alternatively, "activating the sound input and output units of the connection device 200" refers to turning on power supply of the sound input and output units of the connection device 200. The processor 112 executes a sound input/output module for controlling activation of the sound input and output units. The input and output units of the electronic device 100 comprise microphone 162 and the speaker 161, and the sound input and output units of the connection device 200 comprise microphone 241 and the speaker 242 (FIG. 2).

The speaker 161 may be disposed in the front side of the electronic device 100. The microphone 162 converts sound waves originating from human or other sound sources into electrical signals. In addition, the audio device 160 may receive electrical signals from the microphone 162, convert the received electrical signals into audio data signals, and transmit the converted audio data signals to the host device 110. The audio device 160 may include an earphone, a headphone or a headset, which is detachable to the electronic device 100. The external port device 170 is used to connect the electronic device 100 to other devices directly, or to other electronic devices indirectly through a network (for example, Internet, intranet, or wireless LAN). The external port device 170 may include a socket unit disposed in the rear side of the electronic device 100.

The display 190 displays text, graphics, and an image, such as a video, based on signals received from the host device 110. The display 190 is disposed in the front side of the electronic device 100, and may include a window and a touch panel. The window is transparent and is exposed toward the front side of the electronic device 100, through which an image is projected. The touch panel is a transparent switch panel on which the window is stacked. The display 190 may include at least one of an LCD (liquid crystal display), OLED (Organic Light Emitting Diode), an OLED (Organic Light Emitting Diode), a flexible display, and a three-dimensional display. The other input/control devices 180 may include an up/down button for volume control. In addition, the other input/control devices 180 may include at least one of a push button to which a relevant function is assigned, a rocker button, a rocker switch, thumb-wheel, a dial, a stick, and a pointer device such as a stylus.

The external memory device 120 may include one or more high-speed random-access memories (RAMs) such as magnetic disk storage devices, one more nonvolatile memories, one or more optical storage devices, and/or one or more flash memories (for example, NAND flash memories or NOR flash memories). The external memory device 120 stores software. The software may include an operating system program, a communication program, a graphics program, a user interface program, a codec program, and at least on application program. The term "program" comprises a collection of instructions, an instruction set, or a module.

The OS (Operating System) program may be WINDOWS, LINUX, Darwin, RTXC, UNIX, OS X, or an embedded OS such as VxWorks) and may include various software components for controlling general system operations. General system operation controls may include memory control/management, storage hardware (device) control/management, and power control/management. In addition, the OS program may also perform a function for enabling smooth communication between various hardware elements (devices) and software elements (programs). The communication program enables communication with counterpart electronic devices, such as a computer, a server, and en electronic device, through the wireless communication device 150 or the external port device 170. The graphics program provides and displays graphics on the display 190. The graphics may include text, web pages, icons, digital images, videos, and animations. The UI program supports a user interface and processes information concerning state of user interface changes and associated conditions. The codec program performs video file encoding/decoding. The camera program enables camera-related processes and functions. The application program may include a browser application, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, for example. The host device 110 may further include an additional program (instructions) besides the above-described programs.

Figure 3:
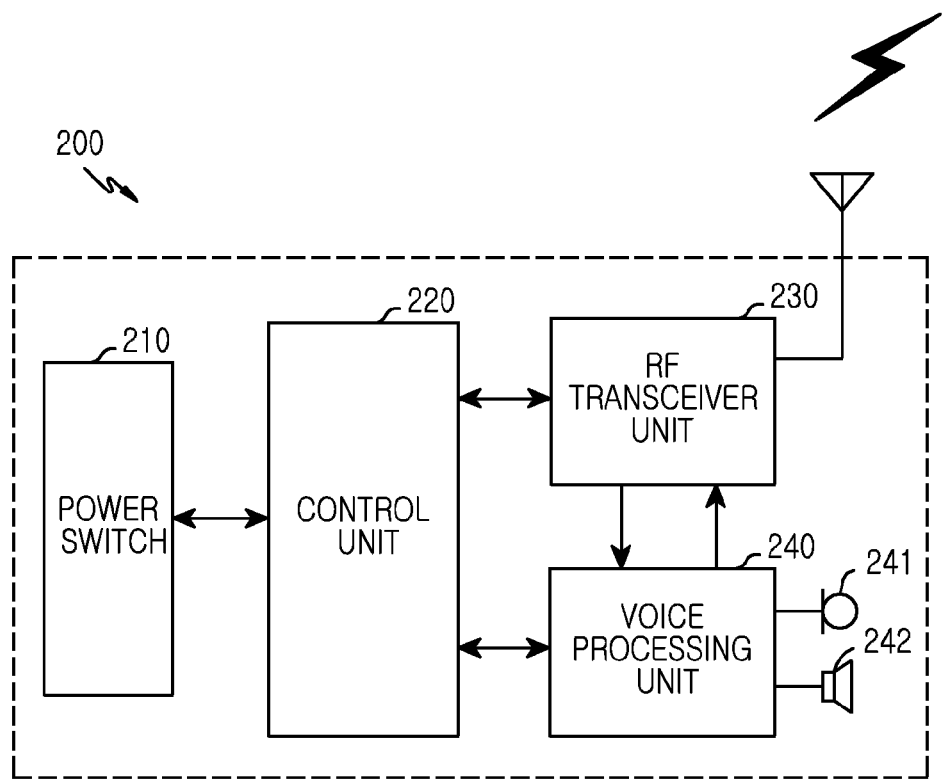
FIG. 3 shows a connection device having a Bluetooth function according to invention principles.

FIG. 3 shows a connection device 200 comprising a communication assistant terminal including a Bluetooth module which establishes a link connection with the electronic device 100 in which a Bluetooth function is implemented and enables voice communication. The connection device 200 includes speaker 242, microphone 241 and a power switch 210 and may perform communication with the electronic device 100. The Bluetooth module is configured by a control unit 220 for performing overall control of the connection device 200 for communication, a Radio Frequency (RF) transceiver unit 230 and a voice processing unit 240. unit 200 includes a separate sensor device (not illustrated). The Bluetooth module enables communication with a Bluetooth device according to the Bluetooth standard. A prescribed interface such as Host Control Interface (HCI) is employed between each Bluetooth module. Message packets associated with the HCI are communicated between the Bluetooth modules. Control commands, results of the control commands, and user data are also communicated between Bluetooth modules. An RS232 interface, a USB interface, or a standard PC interface may, for example, be utilized to transmit an HCI packet. An HCI packet comprises at least one of a command packet, an event packet and a data packet. The command packet provides command words for different uses of the Bluetooth module.

The control unit 220 controls operation of the connection device 200 and the sound input/output module of the connection device 200. For example, the sound input unit of the connection device 200 may be the microphone 241 and the sound output unit may be the speaker 242. The voice processing unit 240 amplifies and modulates voice signals input through the microphone 241 under control of the control unit 220 to generate and transmit signals to the RF transceiver unit 230, and amplifies and demodulates signals received through the RF transceiver unit 230 to transmit voice signals to the speaker 242.

Figure 4:
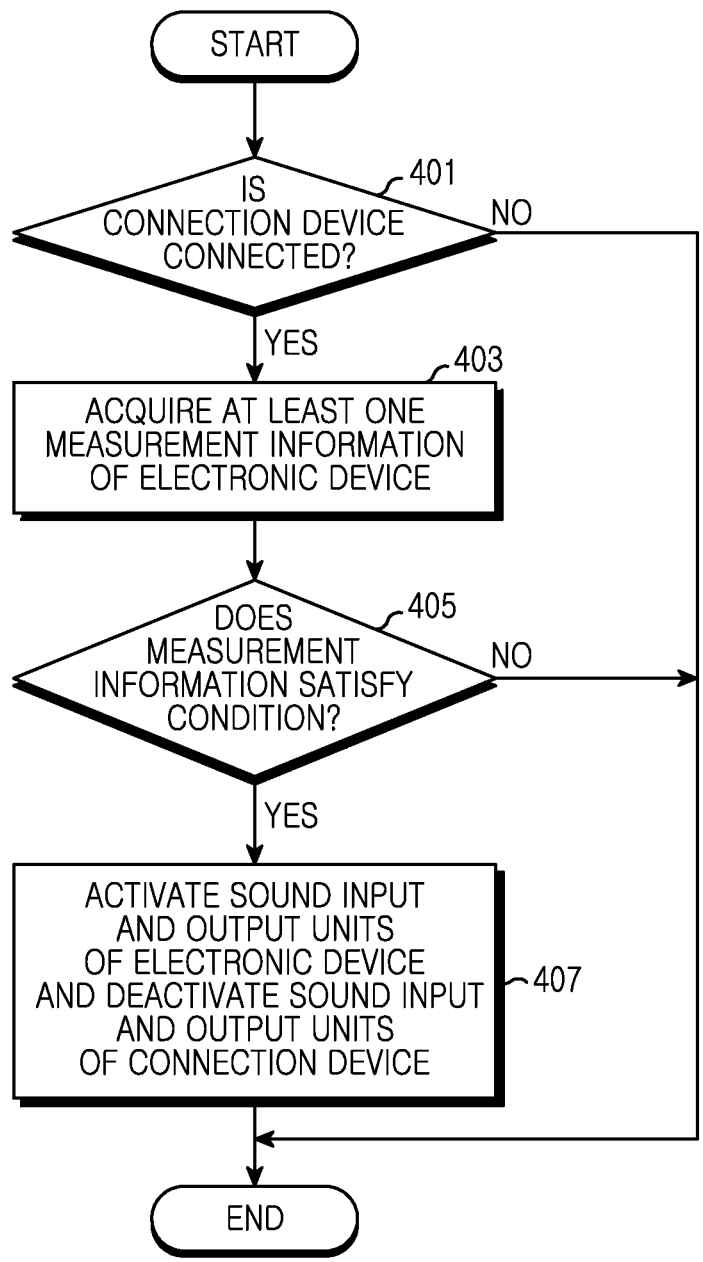
FIG. 4 shows a flowchart of a method for controlling sound input and output in an electronic device according to invention principles.

FIG. 4 shows a flowchart of a method for controlling sound input and output in an electronic device. In step 401, the electronic device 100 determines whether wired or wireless communication is established with connection device 200. The connection device 200 includes a wireless headset, an earset and a headphone and may be a device capable of only inputting sound or only outputting sound, or a device capable of inputting and outputting sound. In the case of wireless connection, a near field communication method may be used. The near field communication method may include Bluetooth communication, NFC (Near Field Communication), WirelessHART communication, Zigbee communication, WiFi, or the like. The connection device 200 includes a module for connecting to the electronic device 100 and enabling voice communication. In addition, when the connection device 200 is connected to the electronic device 100, the sound input and output units of the connection device 200 are activated and the sound input and output units of the electronic device 100 are deactivated.

Herein, "activating the sound input and output units of the connection device 200" refers to switching on signal paths to the sound input and output units of the connection device 200. Alternatively, "activating the sound input and output units of the connection device 200" refers to turning on power supply of the sound input and output units of the connection device 200. The processor 112 executes a sound input/output module in the external memory device 120 for controlling the sound input and output units of the connection device 200 so the sound input and output paths of the electronic device 100 are returned to be those from connection device 200. For example, the input unit of the electronic device 100 may be the microphone 162 and the output unit may be the speaker 161. In addition, the input unit of the connection device 200 may be the microphone 241 and the output unit may be the speaker 242.

When the connection device 200 is connected to the electronic device 100 (step 401), the sensor device 140 acquires at least one item of measurement information of the electronic device 100 in step 403. "Information" is a term used to denote, for example, a value, a parameter, a coefficient, or a component, for example. The measurement information may include movement-related information for determination of whether the electronic device 100 is moved, distance information representing a distance between the electronic device 100 and an object, pressure information representing a pressure applied to the electronic device 100, illumination information representing the measured illuminance of the electronic device 100, and electrical current information representing a current flowing on the surface of the display 190 of the electronic device 100.

The sensor device 140 may be attached to the electronic device 100, and may be an acceleration sensor for measuring a movement acceleration as an implementation example of a motion sensor capable of measuring whether the electronic device 100 is moved, a proximity sensor for measuring a distance between the electronic device 100 and an object, or an pressure sensor for measuring a pressure which is applied to the electronic device 100. In addition, the sensor device 140 may be an illumination sensor for measuring illumination around the electronic device 100, or a current sensor for measuring a current flowing on the surface of the display 190 of the electronic device 100. The measurement information acquired by the sensor device 140 is provided to the processor 112. In step 405, the processor 112 determines whether the measurement information satisfies a predetermined condition based on a measured value from one or more sensors. The processor 112 checks the measurement information provided from the sensor device 140 by comparing the measurement information with a reference value stored in the internal memory 111 and/or the external memory device 120. The reference value may be a value corresponding to the measurement information. For example, the reference value may be a value (numerical value) associated with whether the electronic device 100 Specifically, the processor 112 determines whether the measurement information provided from the sensor device 140 is larger than, smaller than, or equal to the predetermined reference value.

Figure 12:
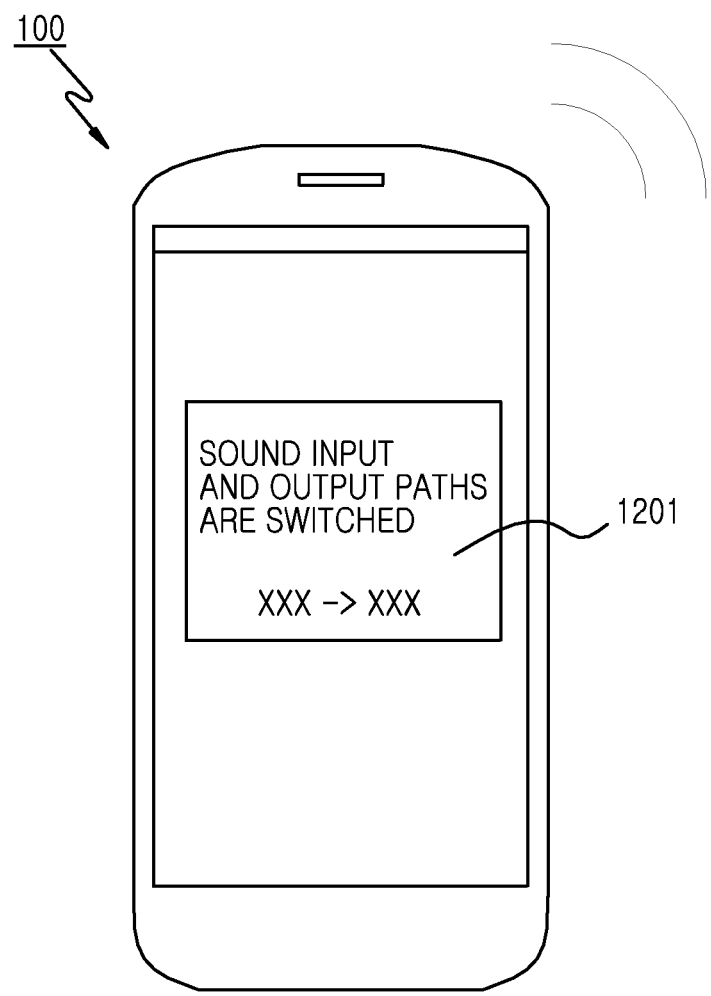
FIG. 12 shows a pop-up window presented on a display according to invention principles.

When the measurement information satisfies a predetermined reference (hereinafter "condition") (step 405), the processor 112 activates the sound input and output units of the connection device 200 and deactivates the sound input and output units of the electronic device in step 407. The processor 112 executes the sound input/output module, and controls the sound input and output units and switches the sound input and output paths from the connection device 200 to the electronic device 100. In addition, a pop-up window 1201 informing the switching of the sound input and output paths is displayed as illustrated in FIG. 12, concurrently when the sound input and output paths are switched. The pop-up window 1201 is displayed along with notification sound and vibration. Alternatively, the notification sound or vibration may generated without window 1201. The text displayed on the pop-up window 1201 is changed in response to a clinical context. When the measurement information satisfies a predetermined reference, processor 112 deactivates the sound input and output units of the electronic device 100 and the connection device 200. In addition, when the measurement information satisfies a predetermined reference, processor 112 activates the sound input and output units of the electronic device 100 and the connection device 200.

Figure 5:
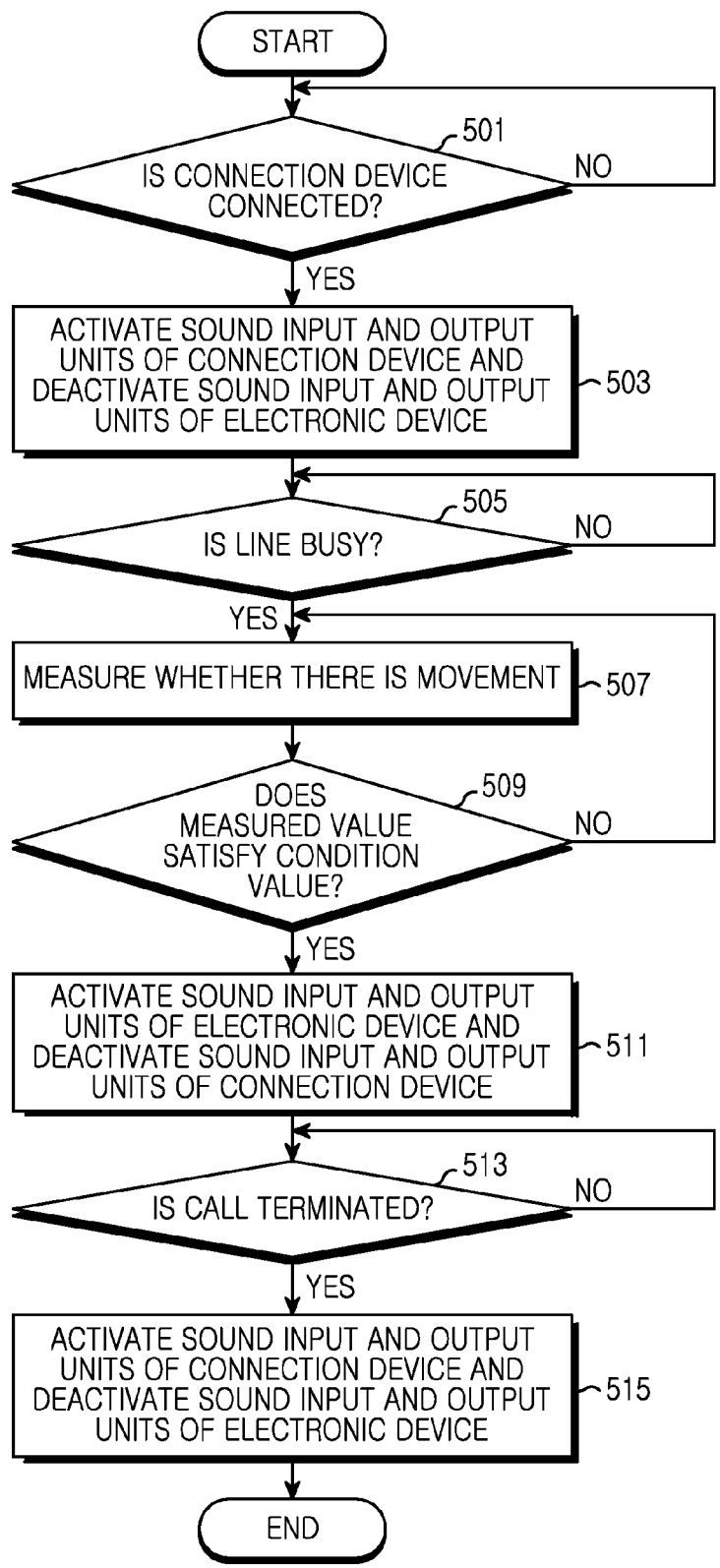
FIG. 5 shows a flowchart of another method for controlling sound input and output in an electronic device according to invention principles.

FIG. 5 shows a flowchart of a method for controlling sound input and output in an electronic device. In step 501, the electronic device 100 determines whether communication is established with the connection device 200. When the connection device 200 is connected to the electronic device 100 (step 501), the processor 112 activates the sound input and output units of the connection device 200 and deactivates the sound input and output units of the electronic device. The processor 112 recognizes the connection with the connection device 200 and controls the sound input/output module to switch the sound input and output paths. That is, the sound input and output paths of the electronic device 100 are switched to the sound input and output paths of the connection device 200 and sound input output paths of device 100 are deactivated (step 503). In step 505, the processor 112 determines whether an incoming call is received, an outgoing call is transmitted, or an outgoing call is possible.

In step 507, the sensor device 140 measures whether the electronic device 100 is moved. Herein, the sensor device 140 may include, for example, an acceleration sensor for detecting dynamic force, such as acceleration, vibration, or impact, using the application principle of inertial force, electrostriction and a gyroscope as a motion sensor for detecting whether the electronic device 100 is moved. The sensor device 140 provides the movement-related information to the processor 112. In step 509, the processor 112 may determine whether the measured value is larger than, smaller than, or equal to a reference value. For example, in the case of using the acceleration sensor, a reference acceleration is a reference value stored in a memory and may be a value (numerical value) corresponding to the measured acceleration. In addition, when the measured acceleration does not exceed a reference acceleration, step 507 may be iteratively performed.

When the measured value exceeds the reference value (step 509), the processor 112 activates the sound input and output units of the electronic device 100 and deactivates the sound input and output units of the connection device 200 in step 511. Processor 112 executes a sound input/output module for controlling activation of the sound input and output units so the sound input and output paths of the connection device 200 are switched to the sound input and output paths of the electronic device 100. In addition, a pop-up window 1201 alerting a user of the switching of the sound input and output paths is displayed as illustrated in FIG. 12, concurrently when the sound input and output paths are switched. The pop-up window 1201 may be displayed along with notification sound and vibration. Alternatively, the notification sound or vibration may be generated without pop-up window 1201 in response to clinical context. When the call is terminated (step 513), the processor 112 activates the sound input and output units of the connection device 200 and deactivates the sound input and output units of the electronic device 100 in step 515. The processor 112 recognizes the termination of the call and switches the sound input and output paths to the sound input and output paths of the connection device 200. In addition, the pop-up window 1201 informing the switching of the sound input and output paths is again displayed as illustrated in FIG. 12.

Figure 6:
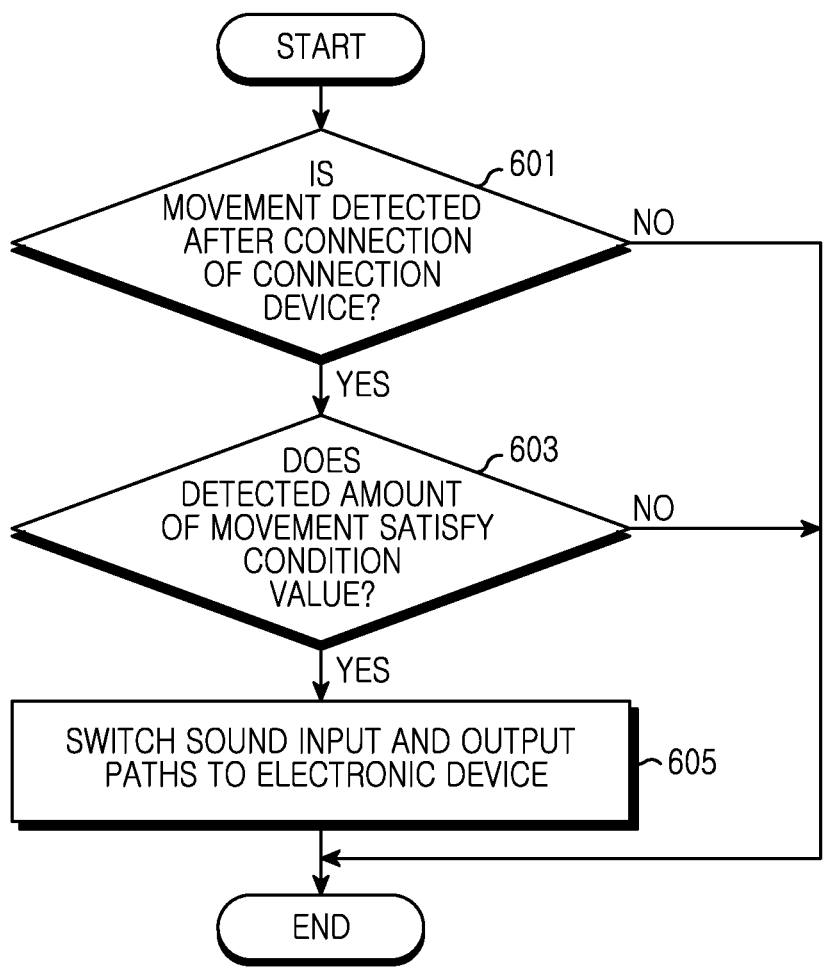
FIG. 6 shows a flowchart of a further method for controlling sound input and output in an electronic device according to invention principles.

FIG. 6 shows a flowchart of a method for controlling sound input and output in an electronic device. In step 601, the electronic device 100 determines whether the electronic device 100 is moved after connecting to the connection device 200. The sensor device 140 measures information related to the movement of the electronic device 100. In step 603, the processor 112 determines whether the detected degree of movement exceeds a reference value. In this case, the reference value may be a value (number) stored in a memory. For example, when a user picks up the electronic device 100 while utilizing the connection device 200, the electronic device 100 moves. The sensor device 140 measures the amount of movement. The processor 112 compares the movement information with the reference value. If the detected amount of the movement exceeds the reference value (step 603), the processor 112 switches the sound input and output paths to those of the electronic device 100. The processor 112 switches (step 605) from the sound input and output paths of the connection device 200 to the sound input and output paths of the electronic device 100. That is, the sound input and output units of the electronic device 100 are activated and the input and output units of the connection device 200 are deactivated. The input and output units of the electronic device 100 may be the microphone 162 and the speaker 161, and the input and output units of the connection device 200 may be the microphone 241 and the speaker 242.

Figure 7:
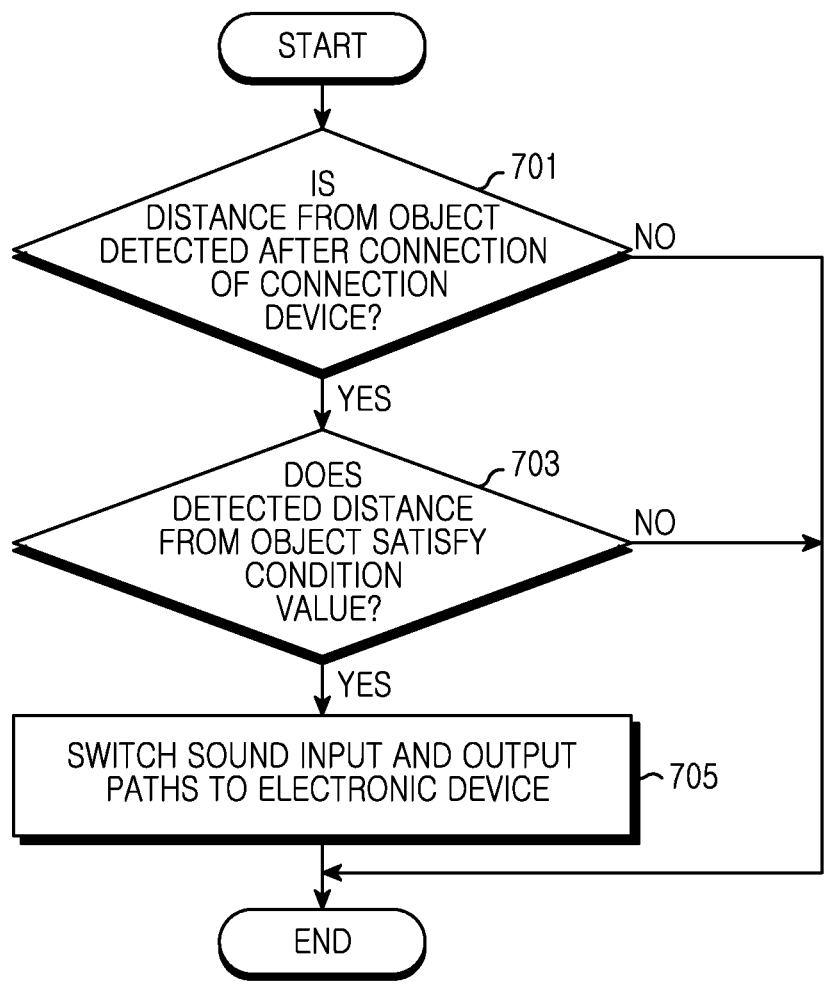
FIG. 7 shows a flowchart of an additional method for controlling sound input and output in an electronic device according to invention principles.

FIG. 7 shows a flowchart of a method for controlling sound input and output in an electronic device. In step 701, the electronic device 100 detects a distance from an object such as a user after connecting to the connection device 200. For example, the sensor device 140 comprises a proximity sensor for measuring information (Hereinafter referred to as distance information) about a distance from the user, and is attached to the electronic device 100. The proximity sensor detects the object using reflected high frequency wave amplitude change whereby a high frequency wave produced by an oscillation circuit reflected from an object is sensed and reduction in oscillation amplitude is used to detect proximity distance. In addition, the sensor device 140 comprises a displacement sensor or a position sensor. The distance information measured by the sensor device 140 is provided to the processor 112.

In step 703, the processor 112 determines whether the detected distance from the object exceeds a reference value. In this case, the reference value may be a value (numerical value) stored in a memory and may be a numerical value corresponding to the distance information. For example, when a user places the electronic device 100 near a part of a user body while utilizing the connection device 200, the sensor device 140 acquires distance information, and the processor 112 compares the distance information with a reference value. When the detected distance from the object satisfies the reference value (step 703), the processor 112 switches the sound input and output paths to the electronic device 100 in step 705. The processor 112 controls switches from the sound input and output paths of the connection device 200 to the sound input and output paths of the electronic device 100. That is, the sound input and output units of the electronic device 100 are activated and the input and output units of the connection device 200 are deactivated.

Figure 8:
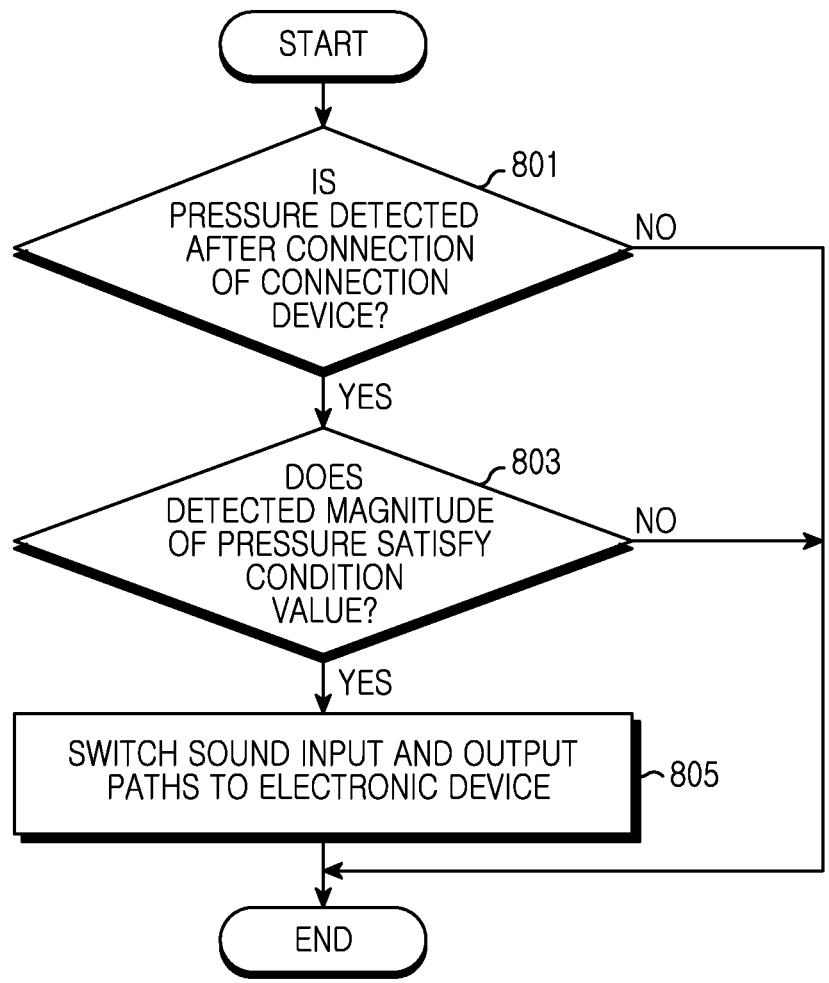
FIG. 8 shows a flowchart of yet another method for controlling sound input and output in an electronic device according to invention principles.

FIG. 8 shows a flowchart of a method for controlling sound input and output in an electronic device. In step 801, the electronic device 100 detects a pressure after connecting to the connection device 200. The pressure may be a pressing force having vertical components acting between the contact surfaces of objects. For example, the sensor device 140 may be a pressure sensor for measuring a pressure (pressure information) about a distance from the user, and may be attached to the electronic device 100. The pressure sensor detects an object by detecting the magnitude of the pressure that is applied from the outside and converts the magnitude into an electrical signal. The pressure information measured by the pressure device is provided to the processor 112. In step 803, the processor 112 determines whether the detected magnitude of the pressure exceeds a reference value. In this case, the reference value is a value (numerical value) stored in a memory, and is a numerical value corresponding to the pressure information. For example, when a user presses a specific portion of the electronic device 100 while utilizing the connection device 200, the sensor device 140 acquires pressure information. The processor 112 compares the pressure information with the reference value.

When the detected magnitude of the pressure exceeds the reference value (step 803), the processor 112 switches the sound input and output paths to the electronic device 100 in step 805. The processor 112 switches from the sound input and output paths of the connection device 200 to the sound input and output paths of the electronic device 100. That is, the sound input and output units of the electronic device 100 are activated and the input and output units of the connection device 200 are deactivated.

Figure 9:
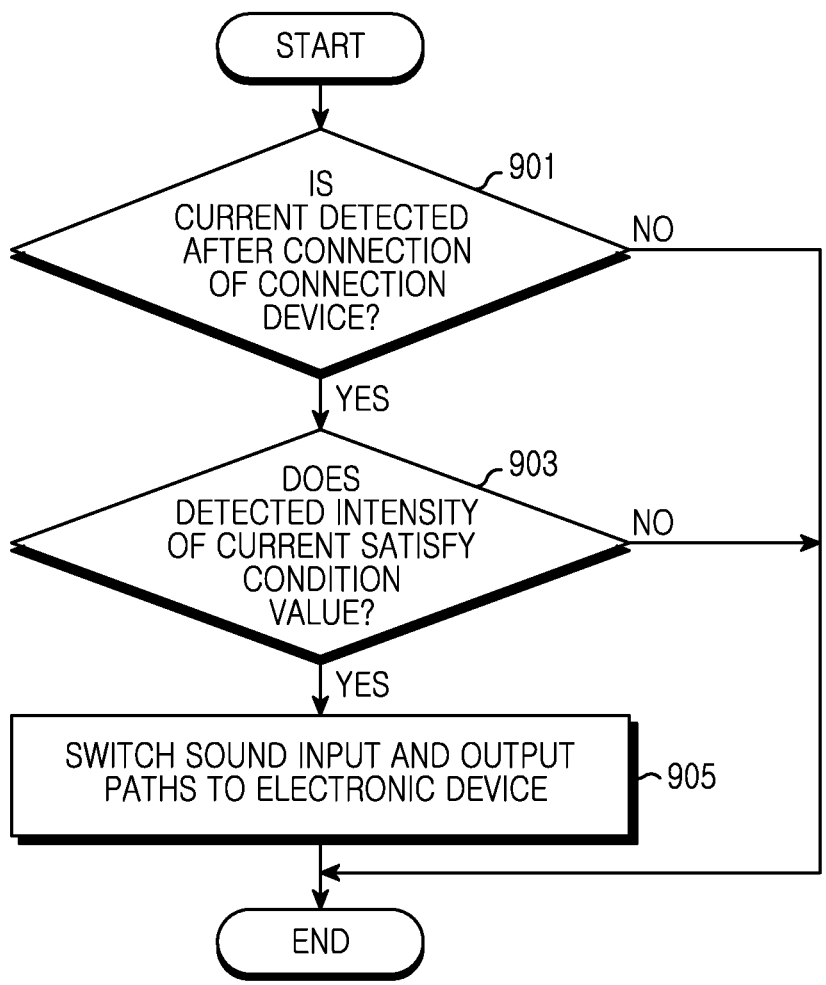
FIG. 9 shows a flowchart of yet another method for controlling sound input and output in an electronic device according to invention principles.

FIG. 9 shows a flowchart of a method for controlling sound input and output in an electronic device. In step 901, the electronic device 100 detects a current after connecting to the connection device 200. The current refers to a current flowing on the surface of the display 190. For example, the sensor device 140 is a current sensor for detecting the current (current information) flowing on the surface of the display 190, and is attached to the front side of the display 190. For example, the current sensor detects a small static electricity flowing when a user fingertip touches it. The current information measured by the current sensor is provided to the processor 112. In step 903, the processor 112 determines whether the detected intensity of the current exceeds a reference value. In this case, the reference value is a value (numerical value) stored in a memory, and is a numerical value corresponding to the current information. For example, when a user touches a specific portion of the electronic device 100 while utilizing the connection device 200, a tiny static electricity flows and the sensor device 140 acquires the current information. The processor 112 compares the current information with the reference value. When the detected intensity of the current exceeds the reference value (step 903), the processor 112 switches the sound input and output paths to the electronic device 100 in step 905. The processor 112 switches from the sound input and output paths of the connection device 200 to the sound input and output paths of the electronic device 100. That is, the sound input and output units of the electronic device 100 are activated and the input and output units of the connection device 200 are deactivated.

Figure 10:
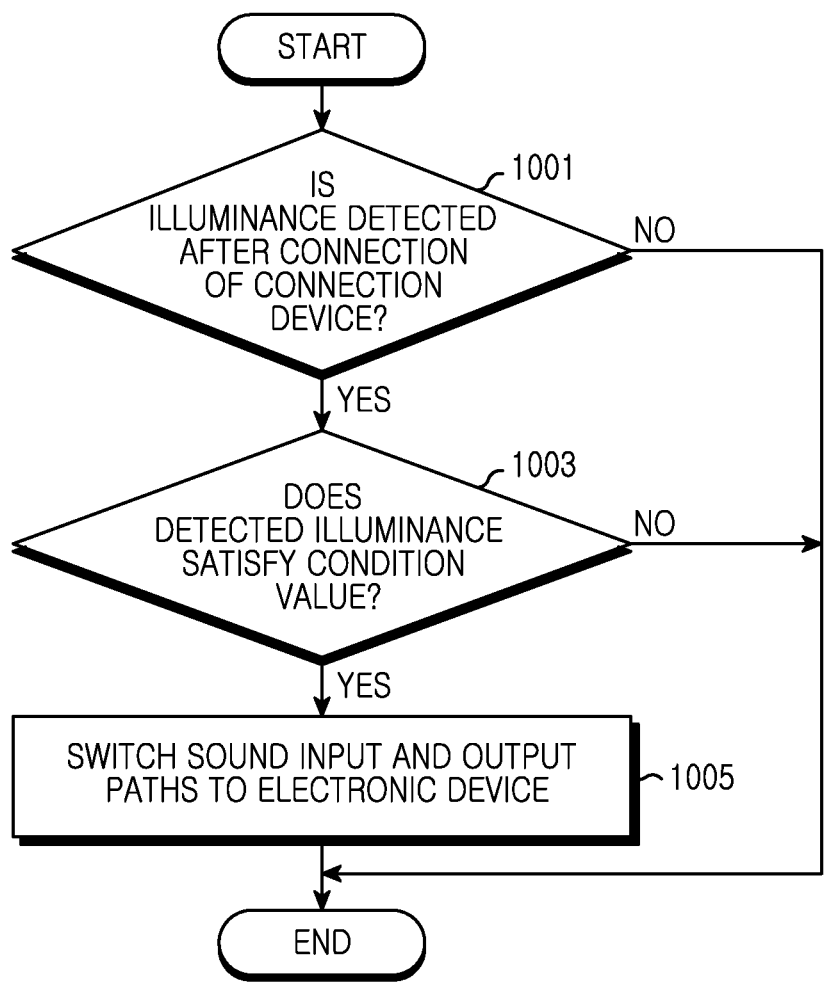
FIG. 10 shows a flowchart of a further method for controlling an electronic device according to invention principles.

FIG. 10 shows a flowchart illustrating a method for controlling an electronic device. In step 1001, the electronic device 100 connects to the connection device 200 and detects illumination. The illumination refers to brightness around the electronic device 100. For example, the sensor device 140 is an illumination sensor for detecting the illumination (illumination information) around the electronic device 100, and is attached to the front side of the display 190. For example, when a part of a user body approaches the sensor, light is blocked to form a dark region. The illumination information measured by the illumination sensor is provided to the processor 112. In step 1003, the processor 112 determines whether the detected illumination exceeds a reference value. In this case, the reference value is a value (numerical value) stored in a memory, and is a numerical value corresponding to the illumination information. For example, when a user picks up the electronic device 100 while utilizing the connection device 200, the electronic device 100 moves. The sensor device 140 acquires the illumination information. The processor 112 compares the illumination information with the reference value.

When the detected illumination exceeds the reference value (step 1003), the processor 112 switches the sound input and output paths to the electronic device 100 in step 1005. The processor 112 controls the sound input/output module to perform switching from the sound input and output paths of the connection device 200 to the sound input and output paths of the electronic device 100. That is, the sound input and output units of the electronic device 100 are activated and the input and output units of the connection device 200 are deactivated.

Figure 11:
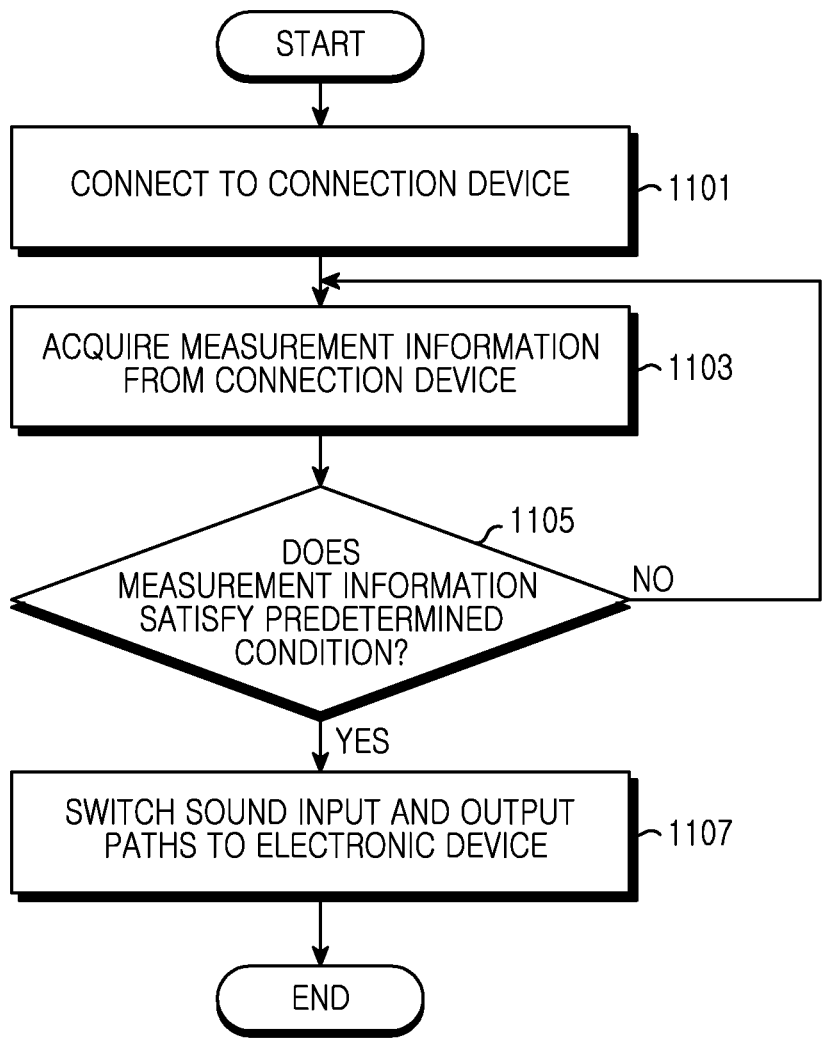
FIG. 11 shows a flowchart of a method for controlling an electronic device according to invention principles.

FIG. 11 shows a flowchart of a method for controlling an electronic device. In step 1101, the electronic device 100 connects to the connection device 200. In step 1103, the sensor device (not illustrated) of the connection device 200 acquires measurement information from the connection device 200. The sensor device is attached to the connection device 200 and acquires the measurement information form the connection device 200. In step 1105, the control unit 220 determines whether the measurement information exceeds a predetermined reference. The predetermined reference is stored in the memory of the connection device 200 and is a reference value (numerical value) corresponding to the measurement information. When the measurement information exceeds the predetermined reference (step 1105), the control unit 220 switches the sound input and output paths to the electronic device 100 in step 1107. For example, the control unit 220 provides a signal to the processor 112. The processor 112, in response, activates the sound input and output units of the electronic device 100 and deactivates the sound input and output units of the connection device 200.

According to the present invention, a method controls sound input and output and an electronic device and enables switching of sound input and output paths without requiring a user interaction to switch the sound input and output paths to the electronic device (for example, action of pressing a button or action of disconnecting the connection device from the electronic device) when the user wants to listen to music and to make a call where the electronic device is connected to a headset equipped with a Bluetooth function.

The methods according to the embodiments described in the claims and/or specification of the present invention may be implemented by hardware, software, or a combination thereof. When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the exemplary embodiments described in the claims and/or specification of the present invention. These programs (software modules or software) may be stored in random access memories (RAMs), nonvolatile memories including flash memories, read only memories (ROMs), electrically erasable programmable ROMs (EEPROMs), magnetic disc storage devices, compact discROMs (CD-ROMs), digital versatile discs (DVDs), other types of optical storage devices, or magnetic cassettes. Also, the programs may be stored in a memory configured by a combination of some or all of such storage devices. Also, each of the memories may be provided in plurality.

The programs can be stored to an attachable storage device of the electronic device accessible via the communication network such as Internet, intranet, LAN, WLAN, or SAN, or a communication network by combining the networks. The storage device can access the electronic device through an external port. Furthermore, a separate storage device in the communication network may access a portable electronic device.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

Under the broadest reasonable interpretation, the appended claims constitute statutory subject matter in compliance with 35 U.S.C. §101. The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method employed by an electronic device, comprising:
    connecting with an external device;
    acquiring information measured in the electronic device;
    determining whether the acquired information satisfies a predetermined condition; and
    selecting sound input and output paths of the external device or the electronic device based on the determining whether the information satisfies the predetermined condition,
    wherein the information measured in the electronic device is acquired in a state where a phone call can be made or is receivable,
    wherein the state includes a state in which an incoming call is received, a state in which an outgoing call is transmitted, and a state in which call-possible phone numbers are displayed on a display of the electronic device.

2. The method of claim 1, wherein the selecting of sound input and output paths of the external device or the electronic device includes controlling sound input and output paths of the external device and electronic device.

3. The method of claim 2, further comprising activating the sound input and output paths of the external device and deactivating the sound input and output paths of the electronic device in response to a call being terminated.

4. The method of claim 1, wherein the predetermined condition is stored in a memory of the electronic device and is a reference threshold value corresponding to the acquired information item value.

5. The method of claim 4, wherein determining whether the acquired information satisfies the predetermined condition comprises determining whether the acquired information item value is larger than, smaller than or equal to the reference threshold value.

6. The method of claim 1, wherein the acquired information includes at least one of:
    movement information indicating whether the electronic device is moved, derived from a sensor;
    distance information representing a distance between the electronic device and an object;
    pressure information representing a pressure applied to the electronic device;
    illumination information representing a measured illumination of the electronic device; and
    electrical current information representing a current flowing on a display surface of the electronic device.

7. The method of claim 6, wherein electronic device movement is detected by an acceleration sensor.

8. An electronic device, comprising:
    a communication unit for establishing communication with an external device;
    a sensor device for acquiring information of the electronic device by measuring the information in the electronic device;
    at least one memory; and
    a processor for determining whether the acquired information satisfies a predetermined condition, and selecting sound input and output paths of the external device or the electronic device based on whether the information satisfies the predetermined condition;
    wherein the information of the electronic device is acquired in a state where a phone call can be made or is receivable,
    wherein the state includes a state in which an incoming call is received, a state in which an outgoing call is transmitted, and a state in which call-possible phone numbers are displayed on a display of the electronic device.

9. The electronic device of claim 8, wherein the external device is connected to the electronic device in a wired or wireless manner, and provides sound input or output functions and comprises at least one of, (a) a headset, (b) an earset and (c) headphones.

10. The electronic device of claim 9, wherein the processor activates the sound input and output paths of the external device, and deactivates sound input and output paths of the electronic device when a call is terminated.

11. The electronic device of claim 8, wherein the predetermined condition is stored in a memory of the electronic device, and is a reference threshold value corresponding to a value of the acquired information item value.

12. The electronic device of claim 11, wherein the processor determines whether the acquired information item value is larger than, smaller than or equal to the reference threshold value.

13. The electronic device of claim 8, wherein the acquired information includes at least one of:
    movement information indicating whether the electronic device is moved through a sensor;
    distance information representing a distance between the electronic device and an object;
    pressure information representing a pressure applied to the electronic device;
    illumination information representing a measured illumination of the electronic device; and
    electrical current information representing a current flowing on a display surface of the electronic device.

14. The electronic device of claim 13, wherein electronic device movement is detected by an acceleration sensor.

15. A method for controlling an electronic device, comprising:
    in response to the electronic device establishing communication with an external device supporting sound input and output, activating sound input and output paths of the external device and deactivating sound input and output paths of the electronic device;
    acquiring movement information value of the electronic device;
    determining whether the acquired movement information value is larger than, smaller than, or equal to a reference threshold value; and
    deactivating the sound input and output paths of the external device and activating the sound input and output paths of the electronic device based on whether the information satisfies a predetermined condition,
    wherein the movement information value is acquired in a state where a phone call can be made or is receivable,
    wherein the state includes a state in which an incoming call is received, a state in which an outgoing call is transmitted, and a state in which call-possible phone numbers are displayed on a display of the electronic device.

16. The method of claim 15, further comprising re-activating the sound input and output paths of the external device and deactivating the sound input and output paths of the electronic device when a call is terminated.

* * * * *